(12) United States Patent
Nagata et al.

(10) Patent No.: US 8,331,226 B2
(45) Date of Patent: Dec. 11, 2012

(54) RADIO COMMUNICATION APPARATUS

(75) Inventors: Nami Nagata, Kawasaki (JP); Kazuo Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 463 days.

(21) Appl. No.: 12/684,246

(22) Filed: Jan. 8, 2010

(65) Prior Publication Data
US 2010/0182925 A1   Jul. 22, 2010

(30) Foreign Application Priority Data

Jan. 20, 2009   (JP) .................................. 2009-10062

(51) Int. Cl.
*H04L 12/26* (2006.01)
(52) U.S. Cl. ...................................................... 370/229
(58) Field of Classification Search .......... 370/229–232, 370/235, 310, 345, 464, 465, 498; 709/223–229, 709/238, 243
See application file for complete search history.

(56) References Cited

U.S. PATENT DOCUMENTS

| | | | |
|---|---|---|---|
| 7,095,732 B1 * | 8/2006 | Watson, Jr. .................... | 370/346 |
| 7,453,804 B1 * | 11/2008 | Feroz et al. .................... | 370/230 |
| 7,583,651 B2 * | 9/2009 | Yamada et al. ................ | 370/345 |
| 7,697,457 B2 * | 4/2010 | Igarashi et al. ................ | 370/254 |
| 7,738,481 B2 * | 6/2010 | Igarashi et al. ................ | 370/448 |
| 7,813,275 B2 * | 10/2010 | Yamada et al. ................ | 370/230 |
| 7,843,817 B2 * | 11/2010 | Gong et al. .................... | 370/229 |
| 7,978,725 B2 * | 7/2011 | Gong et al. .................... | 370/445 |
| 2003/0189948 A1 * | 10/2003 | Sashihara ...................... | 370/445 |
| 2006/0056382 A1 | 3/2006 | Yamada et al. | |
| 2009/0201898 A1 * | 8/2009 | Gong et al. .................... | 370/338 |

FOREIGN PATENT DOCUMENTS

| | | |
|---|---|---|
| JP | 2006-101477 | 4/2006 |
| WO | 2007/047756 | 4/2007 |
| WO | 2007/103891 | 9/2007 |

OTHER PUBLICATIONS

Notification of Reason(s) for Refusal dated Aug. 14, 2012, from corresponding Japanese Application No. 2009-010062.

* cited by examiner

*Primary Examiner* — Dmitry H Levitan
(74) *Attorney, Agent, or Firm* — Katten Muchin Rosenman LLP

(57) ABSTRACT

A radio communication apparatus including: a receiver receiving a traffic evaluation index value of a contention node as a connection node one layer below a self node with a root node of a radio network set as the top layer; parameter determining unit determining a parameter related to priority control of the contention node or a priority for determining the parameter, based on the traffic evaluation index value of the contention node, so that a traffic congestion is prevented and cleared; and a transmitter transmitting the parameter related to the priority control of the contention node or the priority to the contention node.

18 Claims, 15 Drawing Sheets

FIG. 2

RELATED ART

| IFS TYPE | REMARKS |
|---|---|
| AIFS (ARBITRATION INTER FRAME SPACE) | FRAME TRANSMISSION INTERVAL (BASED ON PRIORITY) |
| DIFS (DISTRIBUTED INTER FRAME SPACE) | STANDARD DISTRIBUTED CONTROL FRAME INTERVAL |
| PIFS (POINT INTER FRAME SPACE) | POLING FRAME INTERVAL |
| SIFS (SHORT INTER FRAME SPACE) | SHORT FRAME INTERVAL FOR USE IN ACK AND HAVING TOP PRIORITY |

FIG. 9

| R(n) | ID   | R(n-1) |
|------|------|--------|
|      | NUMBER OF NODES | |

FIG. 11

| PRIORITY | N/P |
|---|---|
| 1 | f(N,P) > a |
| 2 | a ≥ f(N,P) > b |
| 3 | b ≥ f(N,P) > c |
| 4 | c ≥ f(N,P) |

FIG. 12

| PRIORITY | CW | | AIFS | TXOP LIMIT | | |
| | MINIMUM VALUE CWmin | MAXIMUM VALUE CWmax | | PHYSICAL LAYER METHOD | | OTHER PARAMETERS |
| | | | | 802.11b (DSSS,CCK) | 802.11a/g (OFDM) | |
| 4 | aCWmin | aCWmax | 7 | P[ms] | T[ms] | 0 |
| 3 | aCWmin | aCWmax | 3 | Q[ms] | U[ms] | 0 |
| 2 | (aCWmin+1)/2−1 | aCWmin | 2 | R[ms] | V[ms] | 0 |
| 1 | (aCWmin+1)/4−1 | (aCWmin+1)/2−1 | 2 | S[ms] | W[ms] | 0 |

FIG. 14

| PRIORITY | CW | | AIFS | TXOP LIMIT |
| | MINIMUM VALUE CWmin | MAXIMUM VALUE CWmax | | PHYSICAL LAYER METHOD 802.11b (DSSS,CCK) |
|---|---|---|---|---|
| 4 | 31 | 1023 | 7 | 0[ms] |
| 3 | 31 | 1023 | 3 | 0[ms] |
| 2 | 15 | 31 | 2 | 3.0[ms] |
| 1 | 7 | 15 | 2 | 6.0[ms] |

RADIO COMMUNICATION APPARATUS

CROSS-REFERENCE TO RELATED APPLICATION

This application is based upon and claims the benefit of priority from the prior Japanese Patent Application No. 2009-10062 filed on Jan. 20, 2009, the entire contents of which are incorporated herein by reference.

BACKGROUND

1. Field

The present invention relates to a radio communication apparatus forming a radio-communication network.

2. Description of the Related Art

In accordance with the IEEE802.11 standard related to wireless LAN, the carrier sense multiple access with collision avoidance (CSMA/CA) is employed as an access method. A wireless LAN is described below as an example employing CSMA/CA. The present invention is not limited to the wireless LAN.

In accordance with CSMA, each radio communication apparatus transmitting a frame performs beforehand the carrier sensing, and monitors the usage status of a radio channel. If a transmission of another radio communication apparatus is detected, a self radio communication apparatus postpones own transmission in order to avoid collision as much as possible. In CA, backoff control causes a time difference for each radio communication apparatus in a random fashion to avoid collision as much as possible.

FIG. 1 illustrates a communication process in accordance with the CSMA/CA technique. While a radio communication apparatus 1 transmits a transmission frame 1 as illustrated in FIG. 1, radio communication apparatuses 2 and 3 may detect a carrier of the transmission frame 1 and determines that a "busy" state is activated, and postpones the transmission of a frame. When the transmission frame 1 is completed, the radio communication apparatuses 2 and 3 wait on standby during an inter frame space (IFS), and then further wait on standby while performing carrier sensing for a backoff time within a contention window (CW). The backoff time is (slot time)× (random times). For example, the random time is a random integer generated from within uniform distribution having a range of [0, W]. For example, in the case of IEEE802.11b, CW is 31 through 1023, and the slot time is 20 µs. FIG. 2 lists the types of IFS. The methods of usage of four types of IFS are listed in FIG. 2. Distributed inter frame space (DIFS) is typically used.

If no carrier is detected within the backoff time, a frame can be transmitted. Referring to FIG. 1, no carrier is detected within the backoff time of the radio communication apparatus 2, and the radio communication apparatus 2 transmits transmission frame 2. The radio communication apparatus 3 having a backoff time prolonged by a long random time detects a carrier from the radio communication apparatus 2 during the backoff time. The radio communication apparatus 3 thus further waits on standby while performing the carrier sensing.

After the transmission of the transmission frame 2 by the radio communication apparatus 2, the radio communication apparatus 3 waits on standby during the IFS and further waits while performing the carrier sensing during the backoff time. Referring to FIG. 1, the radio communication apparatus 3 having the shortest backoff time transmits frame 3. The radio communication apparatus 1 detects a carrier from the radio communication apparatus 3 within the backoff time, and thus waits on standby while performing the carrier sensing.

In accordance with the above-described process, each radio communication apparatus fairly enjoys transmission opportunity while avoiding packet collision.

Radio communication apparatuses complying with the IEEE802.11 standard may be used as nodes to construct a wireless adhoc network as illustrated in FIG. 3. In such a wireless adhoc network, a root node STA(n+1) at the hierarchically top layer connected to a wired network is connected to nodes STA0($n$), STA1($n$), and STA2($n$) at a second layer. The node STA0($n$) is connected to node STA00($n-1$), STA01($n-1$), and STA02($n-1$) at a third layer. The node STA1($n$) is connected to a node STA10($n-1$) at the third layer. The node STA2($n$) is connected to nodes STA20($n-1$), STA21($n-1$), and STA22($n-1$) at the third layer. The node STA00($n-1$) is connected to a node STA000($n-2$) at a fourth layer. The node STA01($n-1$) is connected to a node STA010($n-2$) at the fourth layer.

In such a tree-structured network, the closer to the root node the node is, the more packets the node receives from the nodes thereunder. Focusing on the nodes STA0($n$), STA1($n$), and STA2($n$) enclosed within a broken-lined box, the STA0($n$) includes six nodes including the self node as the number of nodes thereunder. The node STA2($n$) includes four nodes including the self node as the number of nodes thereunder, and the node STA1($n$) includes 2 nodes including the self node as the number of nodes thereuder. For example, if each node needs to transfer N packets to STA(n+1) during a period T, the node STA1($n$) needs to transfer 2N packets including the packet for the self node, the node STA0($n$) needs to transfer 6N packets including the packet for the self node, and the node STA2($n$) needs to transfer 4N packets including the packet for the self node.

Even if amounts of data are concentrated in a localized manner, CSMA/CA provides simply uniform transmission opportunity. For example, if each node transmits 4N packets within a period T, the node STA1($n$) has a redundant transmission window of 2N=4N−2N, the node STA2($n$) transmits all the packets, and the node STA0($n$) cannot transmit all the packets with 2N=6N−4N left. More specifically, the node STA0($n$) can transmit two-thirds of the packets, and a congestion occurs.

A technique of equalizing the transmission opportunity works if all the nodes are connected to a router in a star configuration with all the nodes having equal opportunity. But the technique of equalizing the transmission opportunity is not appropriate if the wireless adhoc network illustrated in FIG. 3 is constructed.

SUMMARY

According to an embodiment, a radio communication apparatus comprising: a receiver receiving a traffic evaluation index value of a contention node as a connection node one layer below a self node with a root node of a radio network set as the top layer; parameter determining unit determining a parameter related to priority control of the contention node or a priority for determining the parameter, based on the traffic evaluation index value of the contention node, so that a traffic congestion is prevented and cleared; and a transmitter transmitting the parameter related to the priority control of the contention node or the priority to the contention node.

It is to be understood that both the foregoing summary description and the following detailed description are explanatory as to some embodiments of the present invention, and not restrictive of the present invention as claimed.

BRIEF DESCRIPTION OF THE DRAWINGS

FIG. 2 illustrates the types of IFS.

FIG. 9 illustrates an example of data transmitted from a control target node to a controlling node.

FIG. 11 illustrates the mapping relationship between priority and an evaluation index value.

FIG. 12 illustrates the mapping relationship between the priority and a priority control parameter set.

FIG. 14 illustrates a second example of the mapping relationship between the priority and a priority control parameter set.

DESCRIPTION OF EMBODIMENTS

Figure 1:
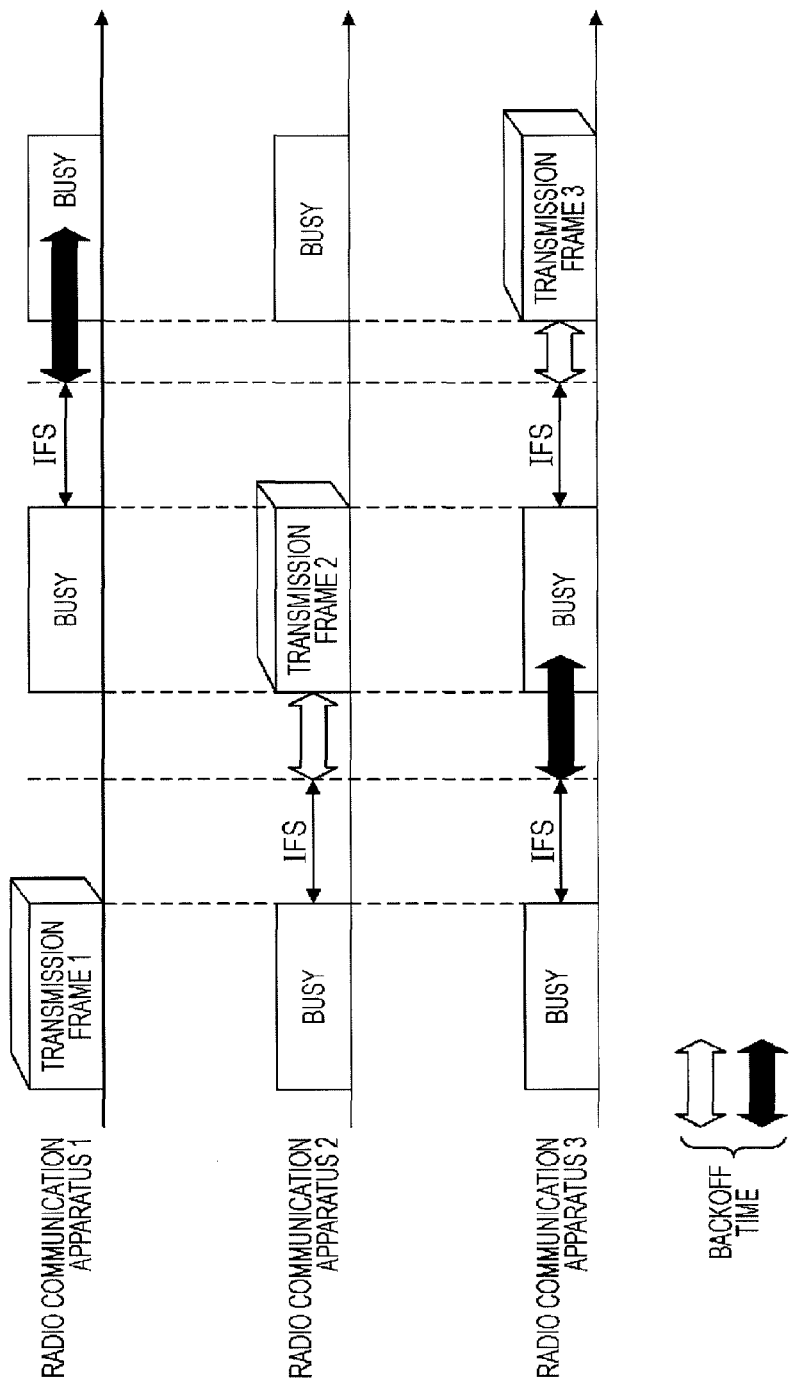
FIG. 1 illustrates a basic communication method of CSMA/CA.
Figure 3:
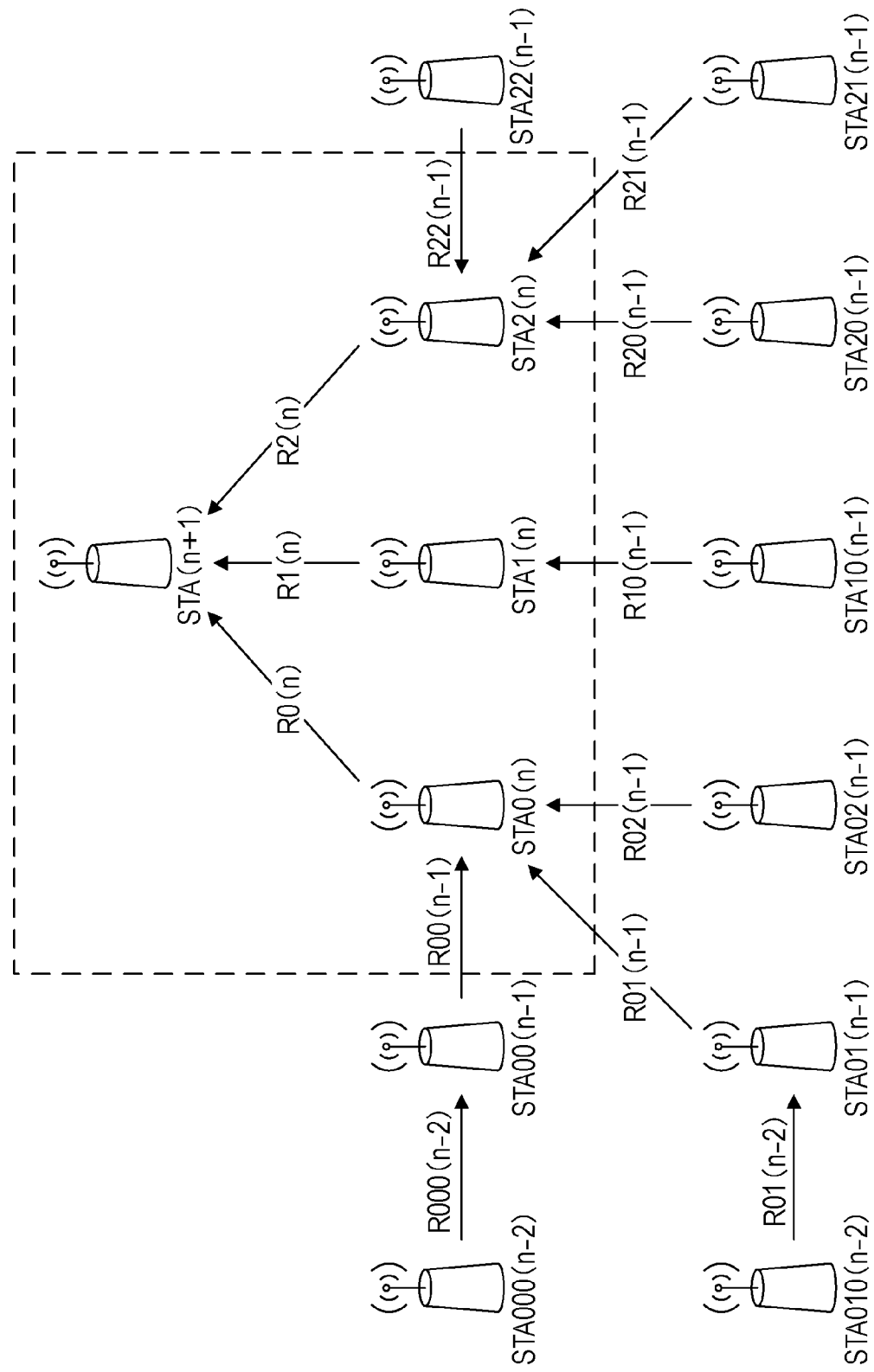
FIG. 3 illustrates an example of a wireless adhoc network.

In accordance with one embodiment, a wireless adhoc network having any configuration may be used. For example, a wireless adhoc network illustrated in FIG. 3 may be constructed using the related art. It is presumed that a communication line to a root node remains fixed until any node becomes unusable, and that no communications are made between nodes outside the communication line.

A process of the embodiment is described with reference to FIG. 4. A priority control parameter determination process as a main process of the embodiment can be performed on all relay nodes other than terminal nodes in the wireless adhoc network. In the discussion that follows, a root node STA(n+1) performs the priority control parameter determination process. The following discussion focuses on the relationship of the root node STA(n+1) and contention nodes STA0($n$), STA1($n$), and STA2($n$) connected to the root node STA(n+1). A node performing the priority control parameter determination process is hereinafter also referred to as a controlling node, and a node receiving and setting a parameter is hereinafter also referred to as a control target node.

Figure 4:
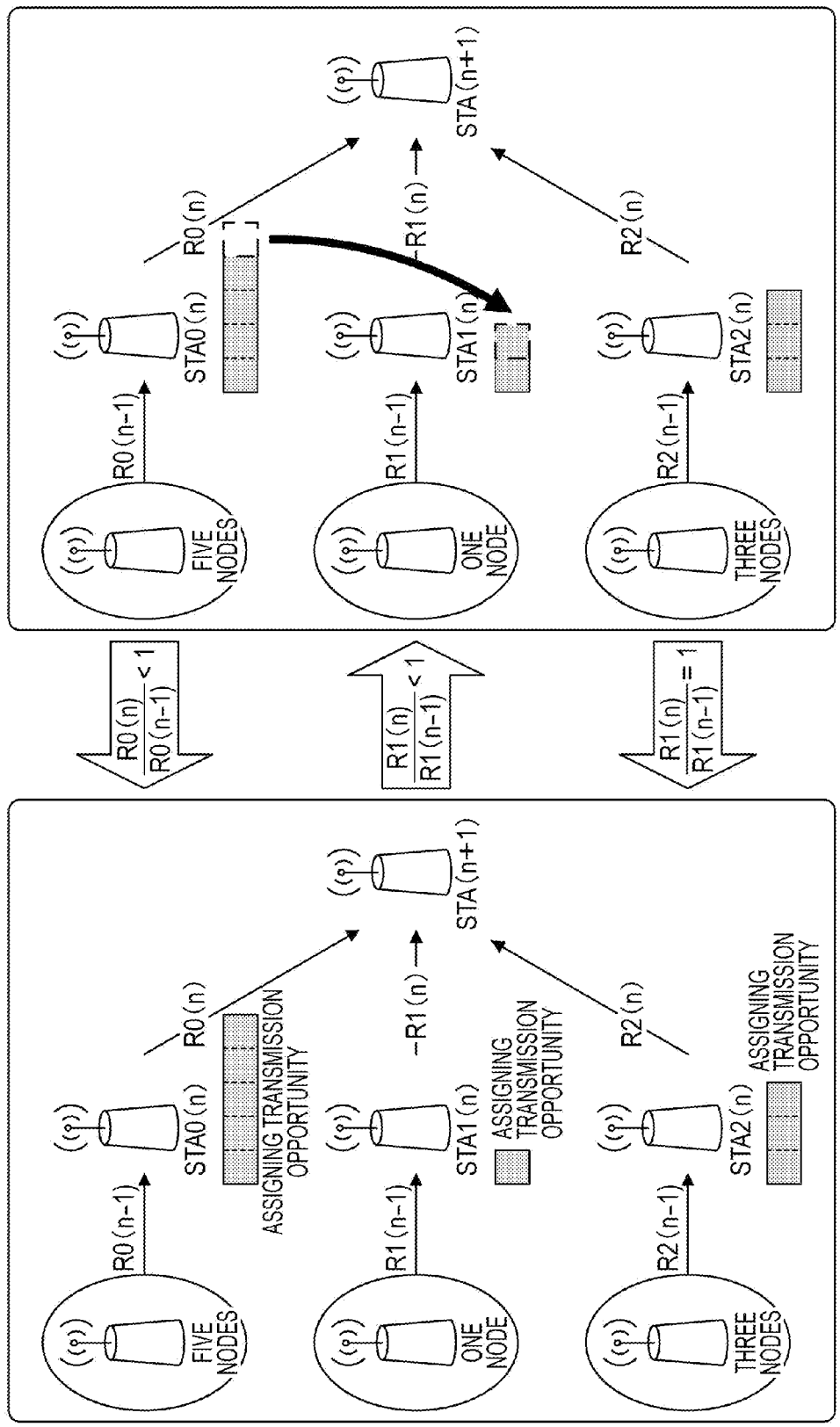
FIG. 4 illustrates an embodiment.

In accordance with the embodiment, each contention node is assigned the transmission opportunity that depends on the number of nodes under the contention nodes in the normal operating condition as illustrated in a left portion of FIG. 4. In other words, a node having a large number of nodes thereunder has a higher priority to transmit packets. More specifically, the node STA0($n$) has five nodes thereunder, the node STA1($n$) has one node thereunder, and the node STA2($n$) has three nodes thereunder. The transmission opportunity of these nodes is STA0($n$):STA1($n$):STA2($n$)=5:1:3. If the contention node generates data and transmits the data to a relay node (here the root node STA(n+1)), this ratio may be set as 6:2:3 counting the self node.

Control of the transmission opportunity (referred to as access control or transmission control) is performed by adjusting values of enhanced distributed channel access (EDCA) parameters (AIFS, CW and TXOP (Transmission Opportunity)) defined in IEEE802.11e standard (QoS control).

The contention node monitors an input rate and an output rate thereto. The input rate is a data rate of packets received from the nodes under the contention node (or an amount of data per a constant period of time). The output rate is a data rate of packets transmitted to an hierarchically upper layer. The input rate of the node STA0($n$) is denoted by R0($n$−1), and the output rate of the node STA0($n$) is denoted by R0($n$). The input rate of the node STA1($n$) is denoted by R1($n$−1), and the output rate of the node STA1($n$) is denoted by R1($n$). The input rate of the node STA2($n$) is denoted by R2($n$−1) and the output rate of the node STA2($n$) is denoted by R2($n$). A transmission packet generated by a self node is accounted for in the input rate.

These pieces of data is collected by a relay node (here root node) STA(n+1), and an input-output rate ratio described below is calculated.

$$P0(n) = \frac{R0(n)}{R0(n-1)}$$
$$P1(n) = \frac{R1(n)}{R1(n-1)}$$
$$P2(n) = \frac{R2(n)}{R2(n-1)}$$

Equation (1)

If the input rate equals the output rate, in other words, P0($n$)=1, P1($n$)=1, and P2($n$)=1, a transmission opportunity equal to a necessary level or higher results. If the output rate is lower than the input rate, in other words, any of states P0($n$)<1, P1($n$)<1 and P2($n$)<1 occurs, the transmission opportunity becomes insufficient, and packets can stay put within a contention node. If such a condition continues, a buffer overflow takes place within the contention node, leading to a possibility that transmission data is missing.

The transmission opportunity may be provided in response to the number of hierarchically lower nodes, and at least one of the contention nodes may shift to any of the states P0($n$)<1, P1($n$)<1, and P2($n$)<1. In such a case, the budget of the transmission opportunity is reassigned. As denoted by a right-looking center arrow in FIG. 4, the node STA1($n$) has P1($n$) <1, and the other contention nodes have P0($n$)=1 and P2($n$) =1. The transmission opportunity of one of the nodes STA0 ($n$) and STA2($n$) is reduced while the transmission opportunity of the node STA1($n$) is increased.

As denoted by a left-looking center arrow in FIG. 4, P1($n$) of the node STA1($n$) may become 1, or one of P0($n$) of the nodes STA0($n$) and P2($n$) of STA2($n$) may become less than 1. In such a case, the transmission opportunity returns to the state on the left-hand portion of FIG. 4.

Fairness is assured among the nodes based on the number of nodes under each node in a normal operating condition. If a traffic congestion takes place, transmission opportunity is temporarily re-assigned from a source node free from traffic congestion. Performance drop is thus prevented on the overall network. If the traffic congestion is cleared, or if a traffic congestion takes place on the source node that was congestion free heretofore, the normal operating condition resumes.

By performing generally the process on the wireless adhoc network, (1) the transmission opportunity is provided depending on the number of hierarchically lower nodes so that fairness is assured over all the nodes. (2) A node having a large number of hierarchically lower nodes is subject to congestion due to packet concentration. By raising the priority on such a node, a congestion control effect is expected. (3) Even if a congestion takes place on a node other than a node at which paths to the root node converge, a remedial step can be taken. Efficient packet transmission may be performed. (4) Traffic is monitored. If a change occurs in a transmission line or in response to the movement of a node, a network topology or a transmission rate may change. In such a case, a remedial step can be flexibly taken. (5) By setting a transmission destination (STA(n+1) in FIG. 3) of a contention node to be a controlling point, the transmission opportunity is balanced among the contention nodes for adjustment. Although no communications are performed between contention nodes, balancing is achieved by the relay node, and fair and appropriate adjustment is performed. (6) If control by EDCA parameter set is introduced as will be described later, compatibility with IEEE802.11e standard is increased. In the case of a radio communication unit complying with IEEE802.11e standard, an increase in modification costs is controlled. Optionally, the apparatus may comply with a different standard.

Figure 5:
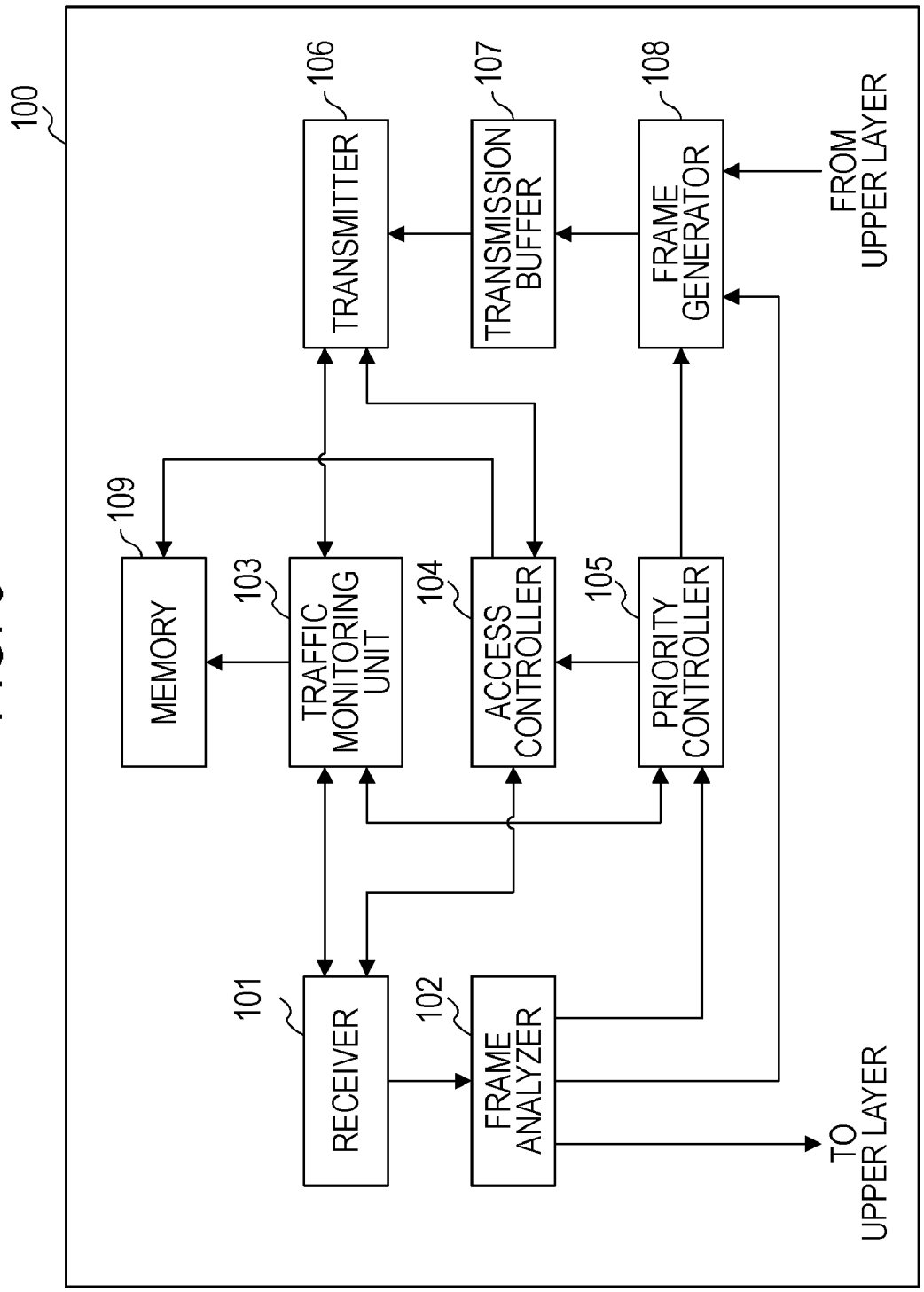
FIG. 5 is a functional block diagram of a radio communication apparatus serving as a control target node.

FIG. 5 is a functional block diagram of a radio communication apparatus 100 serving as one of the contention nodes STA0(n), STA1(n), and STA2(n) (i.e., control target nodes). The radio communication apparatus 100, serving as a contention node, includes receiver 101, frame analyzer 102, traffic monitoring unit 103, access controller 104, priority controller 105, transmitter 106, transmission buffer 107, frame generator 108, and memory 109. The receiver 101, connected to an input, cooperates with the traffic monitoring unit 103 and the access controller 104. Upon receiving data of a reception packet from the receiver 101, the frame analyzer 102 analyzes the data and outputs the analysis results to one of a processor at an upper layer and the frame generator 108. The frame analyzer 102 also cooperates with the priority controller 105.

The frame generator 108 receives data from one of the upper layer and the frame analyzer 102, processes the received data, and outputs process results to the transmission buffer 107. In response to an instruction from the priority controller 105, the frame generator 108 performs the process thereof. The transmitter 106 outputs frame data stored on the transmission buffer 107 in a packet to the outside. The transmitter 106 cooperates with the traffic monitoring unit 103 and the access controller 104.

The priority controller 105 and the traffic monitoring unit 103 cooperates with each other in the execution of the processes thereof. The access controller 104 performs the process thereof in response to an instruction from the priority controller 105. The traffic monitoring unit 103 and the access controller 104 uses the memory 109.

The frame analyzer 102 analyzes the packet received by the frame analyzer 102 in terms of the destination and type of the packet, and hands over to the upper layer the packet if the packet is an ordinary data packet. A transfer packet or a packet transmitted from a self node (i.e., an upper layer) to another node is output from the frame analyzer 102 to the frame generator 108. The frame generator 108 constructs a frame by attaching to the packet a destination in accordance with control of an adhoc routing protocol, and stores temporarily the frame data onto the transmission buffer 107. The frame data is then transmitted via the transmitter 106 under the control of the access controller 104.

The access controller 104 performs a control process based on CSMA/CA. The access controller 104 performs the control process based on parameters AIFS, CW, and TXOP defined in the IEEE802.11e standard. These parameters may be modified by the priority controller 105.

The priority controller 105 sets the parameters on the access controller 104 based on priority control information transmitted from a relay node (also referred to as a controlling node such as STA(n+1)). Setting data may be stored on the memory 109, for example. The traffic monitoring unit 103 stores on the memory 109 information including the observed input and output rates, and the number of hierarchically lower nodes. In response to an instruction from the priority controller 105, the traffic monitoring unit 103 outputs to the priority controller 105 the information as traffic information. The priority controller 105 outputs to the frame generator 108 the traffic information, causing the frame generator 108 to generate frame data including the traffic information, and causing the transmitter 106 to transmit the frame data in a packet.

The traffic monitoring unit 103 measures and records the input rate based on the data from the receiver 101 and the output rate based on the data from the transmitter 106. In response to a request from the priority controller 105, the traffic monitoring unit 103 outputs the input and output rates to the priority controller 105. The traffic monitoring unit 103 may acquire the number of hierarchically lower nodes by counting the number of transmission source addresses of the received packets arriving at the self node. More specifically, each time a new transmission source address is detected, the new transmission source address may be registered on the memory 109 while the count value is incremented by one.

Figure 6:
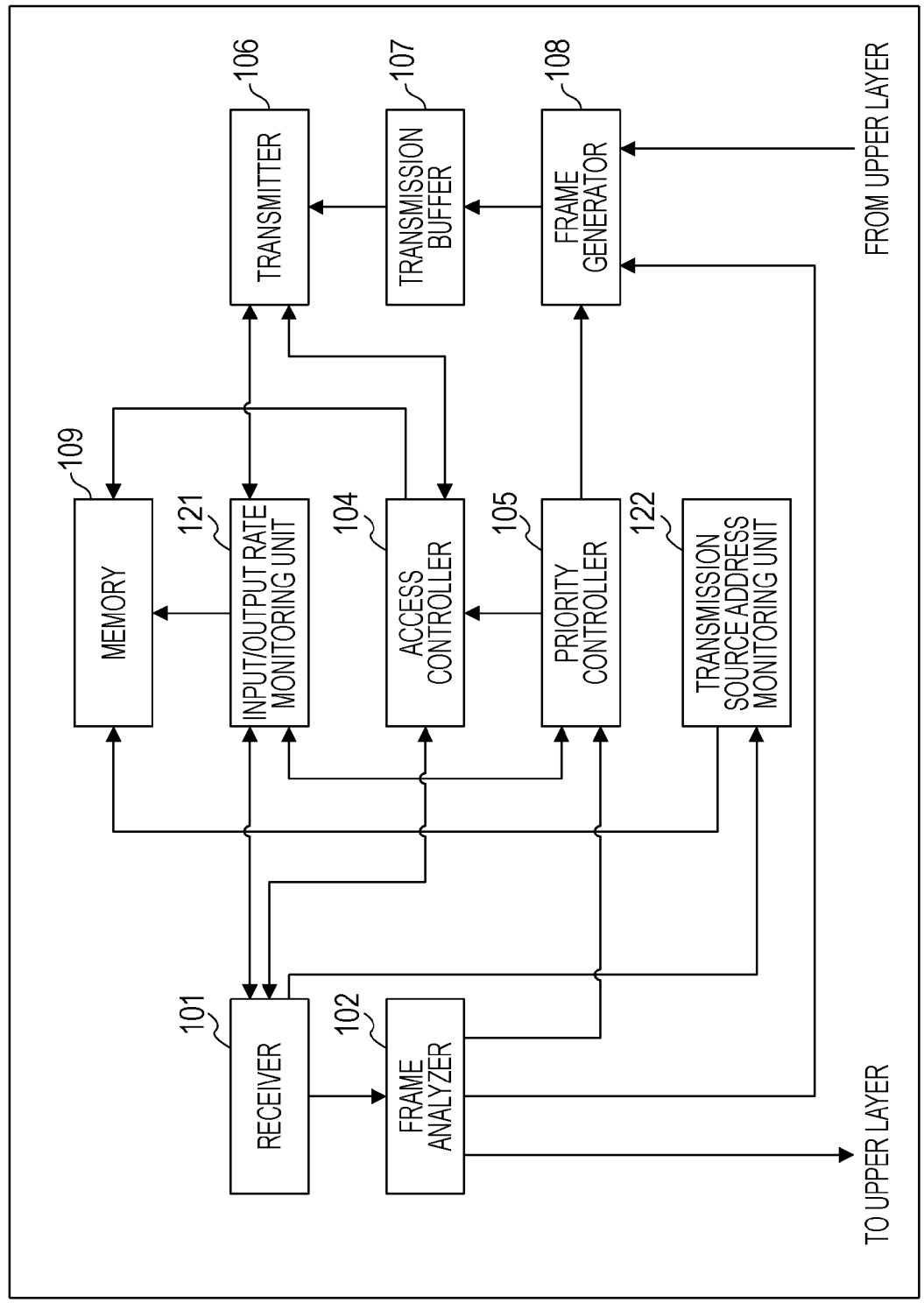
FIG. 6 is a functional block diagram of a second radio communication apparatus serving as a control target node.

The radio communication apparatus may be constructed as illustrated in FIG. 6. An input-output rate monitoring unit 121 measuring the input rate and the output rate may be incorporated in place of the traffic monitoring unit 103. A transmission source address monitoring unit 122 for counting the number of hierarchically lower nodes is newly incorporated. The transmission source address monitoring unit 122 receives a copy of the received packet from the receiver 101, extracts a transmission source address, and searches a transmission source address list registered on the memory 109 to determine whether a new transmission source address is detected. If a new transmission source address is detected, the transmission source address monitoring unit 122 registers that transmission source address in the transmission source address list and increments the count value by one. The input-output rate monitoring unit 121 stores on the memory 109 the data of the input rate and the output rate measured from the data from the transmitter 106 and the receiver 101. In response to an instruction from the priority controller 105, the input-output rate monitoring unit 121 causes the transmitter 106 to transmit to the controlling node the hierarchically lower nodes, counted by the transmission source address monitoring unit 122, together with the data of the input rate and the output rate stored on the memory 109.

Figure 7:
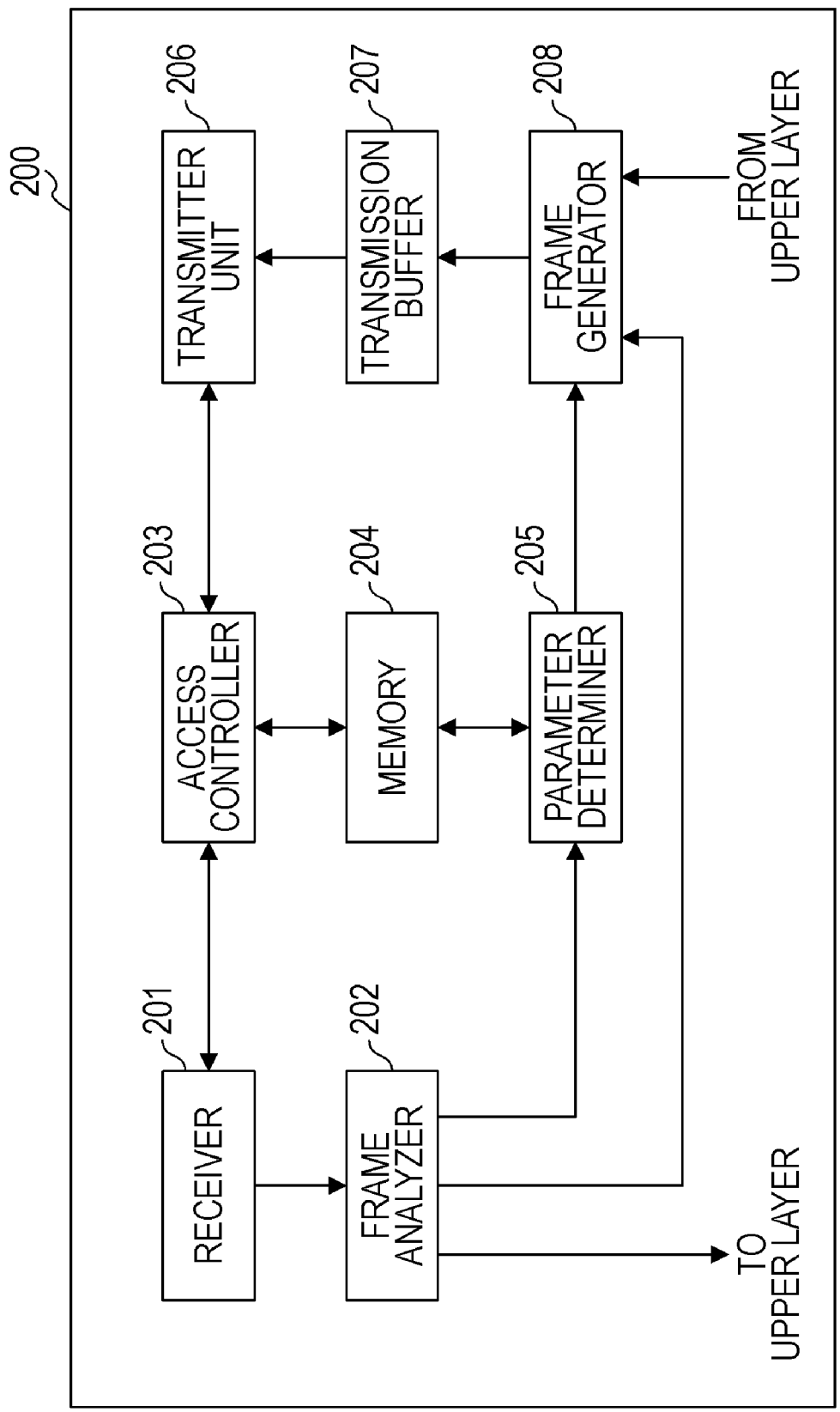
FIG. 7 is a functional block diagram of a radio communication apparatus serving as a controlling node.

FIG. 7 is a functional block diagram of the root node STA(n+1) as a controlling node. A radio communication apparatus 200 serving as the controlling node STA(n+1) includes receiver 201, frame analyzer 202, access controller 203, memory 204, parameter determiner 205, transmitter 206, transmission buffer 207, and frame generator 208.

The receiver 201, connected to an input from the outside, cooperates with the access controller 203. Upon receiving data of a received packet from the receiver 201, the frame analyzer 202 analyzes the data, and outputs the analysis results to one of a processor at an upper layer and the frame generator 208. The frame analyzer 202 also cooperates with the parameter determiner 205.

The frame generator 208 receives data from one of the upper layer and the frame analyzer 202, processes the data, and outputs the process results to the transmission buffer 207. The frame generator 208 may generate frame data based on the output from the parameter determiner 205. The parameter determiner 205 and the access controller 203 use the memory 204. The transmitter 206 outputs the frame data stored on the transmission buffer 207 in a packet to the outside. The transmitter 206 cooperates with the access controller 203.

The frame analyzer 202 analyzes a packet received by the receiver 201 in terms of a destination and type of the packet. A data packet is handed over to the upper layer if the data packet is an ordinary packet. A transfer packet or a packet transmitted from a self node (i.e., an upper layer) to another node is output from the frame analyzer 202 to the frame generator 208. The frame generator 208 constructs a frame by attaching to the packet a destination in accordance with control of an adhoc routing protocol, and stores temporarily the frame data onto the transmission buffer 207. The frame data is then transmitted via the transmitter 206 under the control of the access controller 203.

The access controller 203 performs a control process based on CSMA/CA. The access controller 203 performs the control process based on parameters AIFS, CW, and TXOP defined in the IEEE802.11e standard. These parameters may be based on the setting data stored on the memory 204.

The parameter determiner 205 calculates the input-output rate ratio described above with reference to each contention node, based on the traffic information transmitted from the contention node (also referred to as a control target node), and stores the input-output rate ratio on the memory 204. If the input-output rate ratios of all the control target nodes are 1 (P0($n$)=1, P1($n$)=1, and P2($n$)=1), a priority control parameter is determined in a manner such that the transmission opportunity is provided depending on the number of nodes under each contention node. More specifically, the more the hierarchically lower nodes, the higher the transmission opportunity becomes.

If a contention node having an input-output rate ratio less than 1 appears, the priority control parameter is determined so that the transmission opportunity of the contention node having an input-output rate ratio of 1 is reduced and so that the transmission opportunity of the contention node having an input-output rate ratio less than 1 is increased. The initial state is restored when the input-output rate ratio of the contention node with the transmission opportunity thereof increased is restored back to 1 later or when the input-output rate ratio of the contention node with the transmission opportunity thereof decreased becomes less than 1 later.

The priority control parameter thus determined of each of the contention nodes is output to the frame generator 208 in order to generate a priority control parameter notification frame. The transmitter 206 then transmits the notification frame to the control target node. The notification packets may be individually transmitted in a unicast fashion or may be broadcast to all the control target nodes at a time.

Figure 8:
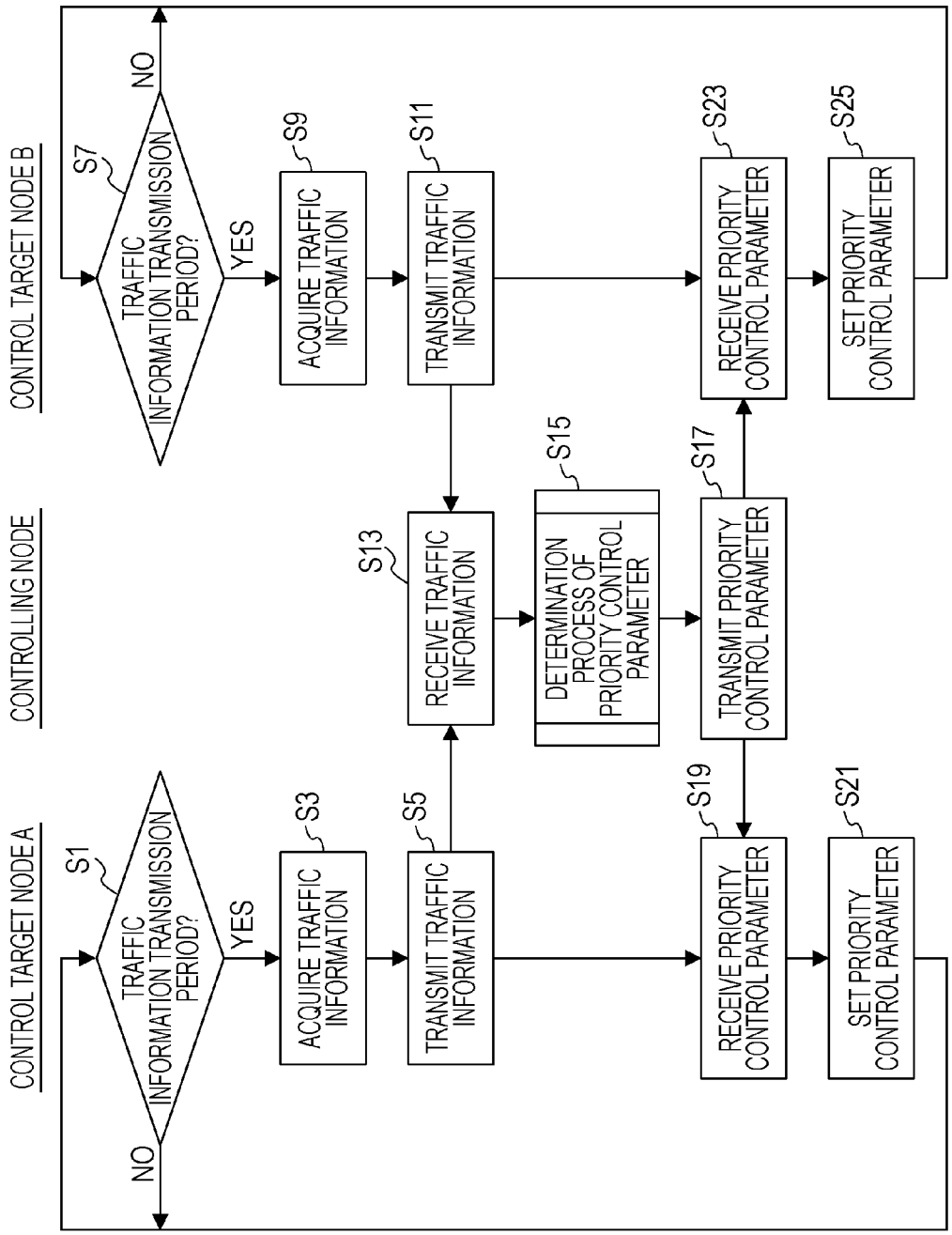
FIG. 8 is a flowchart of a main process.

Process flows of the controlling node and the control target node are described with reference to FIGS. 8-14. FIG. 8 illustrates the general process flow. The priority controller 105 of a control target node A determines whether the traffic information agrees with a predetermined traffic information transmission period (step S1). For example, a timer may be arranged to measure the traffic information transmission period. If the traffic information fails to agree with the predetermined traffic information transmission period, the priority controller 105 waits on standby until the traffic information shifts to the predetermined traffic information period. If the traffic information agrees with the predetermined traffic information period, the priority controller 105 issues an instruction to the traffic monitoring unit 103. In response to the instruction from the priority controller 105, the traffic monitoring unit 103 reads the traffic information, i.e., the number of hierarchically lower nodes, the input rate R(n−1), and the output rate R(n) (step S3), and outputs the read information to the priority controller 105. The priority controller 105 outputs the traffic information received from the traffic monitoring unit 103 to the frame generator 108 to cause the frame generator 108 to generate the frame data containing the traffic information. The priority controller 105 causes the transmitter 106 to transmit to the controlling node a packet containing the traffic information based on the frame data (step S5). The transmission operation is controlled by the access controller 104.

The above-described process may be performed on another contention node if the other contention node such as the contention node B exists. More specifically, the priority controller 105 of the control target node B determines whether the traffic information agrees with a predetermined traffic information transmission period (step S7). If the traffic information fails to agree with the predetermined traffic information transmission period, the priority controller 105 waits on standby until the traffic information shifts to the predetermined traffic information transmission period. If the traffic information agrees with the predetermined traffic information transmission period, the priority controller 105 issues an instruction to the traffic monitoring unit 103. In response to the instruction from the priority controller 105, the traffic monitoring unit 103 reads the traffic information, i.e., the number of hierarchically lower nodes, the input rate R(n−1), and the output rate R(n) (step S9), and outputs the read information to the priority controller 105. The priority controller 105 outputs the traffic information received from the traffic monitoring unit 103 to the frame generator 108 to cause the frame generator 108 to generate the frame data containing the traffic information. The priority controller 105 causes the transmitter 106 to transmit to the controlling node a packet containing the traffic information based on the frame data (step S11). The transmission operation is controlled by the access controller 104.

Figure 9:
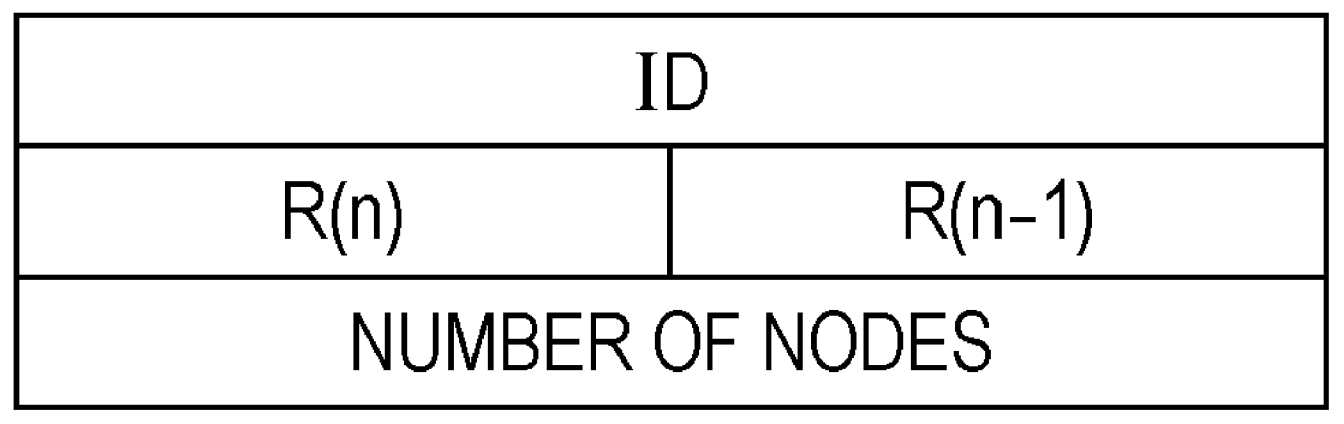

Data illustrated in FIG. 9 is transmitted from the control target node. The data contains the ID of the node, the output rate R(n), the input rate R(n−1), and the number of hierarchically lower nodes.

The receiver 201 of the controlling node receives the packet containing the traffic information from one of the control target nodes A and B (step S13), and outputs the packet to the frame analyzer 202. The frame analyzer 202 recognizes the packet containing the traffic information and outputs the packet to the parameter determiner 205. Upon receiving the traffic information, the parameter determiner 205 stores the traffic information onto the memory 204. After receiving the traffic information from all the control target nodes, the parameter determiner 205 performs a priority control parameter determination process (step S15). The priority control parameter determination process will be described in detail later.

If the priority control parameter for each control target node is determined through the priority control parameter determination process, the parameter determiner 205 instructs the frame generator 208 to generate the frame data containing the priority control parameter determined for each control target node, and causes the transmitter 206 to transmit to each control target node the packet containing the priority control parameter (step S17). This transmission operation is controlled by the access controller 203.

The priority control parameters, if complying with IEEE802.11e standard, contain AIFS, CW, and TXOP parameters.

Upon receiving the packet containing the priority control parameter from the controlling node (step S19), the receiver 101 of the control target node A outputs the packet to the frame analyzer 102. Recognizing the packet containing the priority control parameter, the frame analyzer 102 outputs the data of the priority control parameter to the priority controller 105. The priority controller 105 sets the received priority control parameter on the access controller 104 (step S21). For example, the access controller 104 stores the received priority control parameter onto the memory 109. The access controller 104 controls the packet transmission of the transmitter 106 in accordance with the set priority control parameter. Processing returns to step S1.

Upon receiving the packet containing the priority control parameter from the controlling node (step S23), the receiver 101 of the control target node B outputs the packet to the frame analyzer 102. Recognizing the packet containing the priority control parameter, the frame analyzer 102 outputs the data of the priority control parameter to the priority controller 105. The priority controller 105 sets the received priority control parameter on the access controller 104 (step S25). For example, the access controller 104 stores the received priority control parameter onto the memory 109. The access controller 104 controls the packet transmission of the transmitter 106 in accordance with the set priority control parameter. Processing returns to step S7.

By repeating the above-described process, the previously described advantages are provided.

Figure 10:
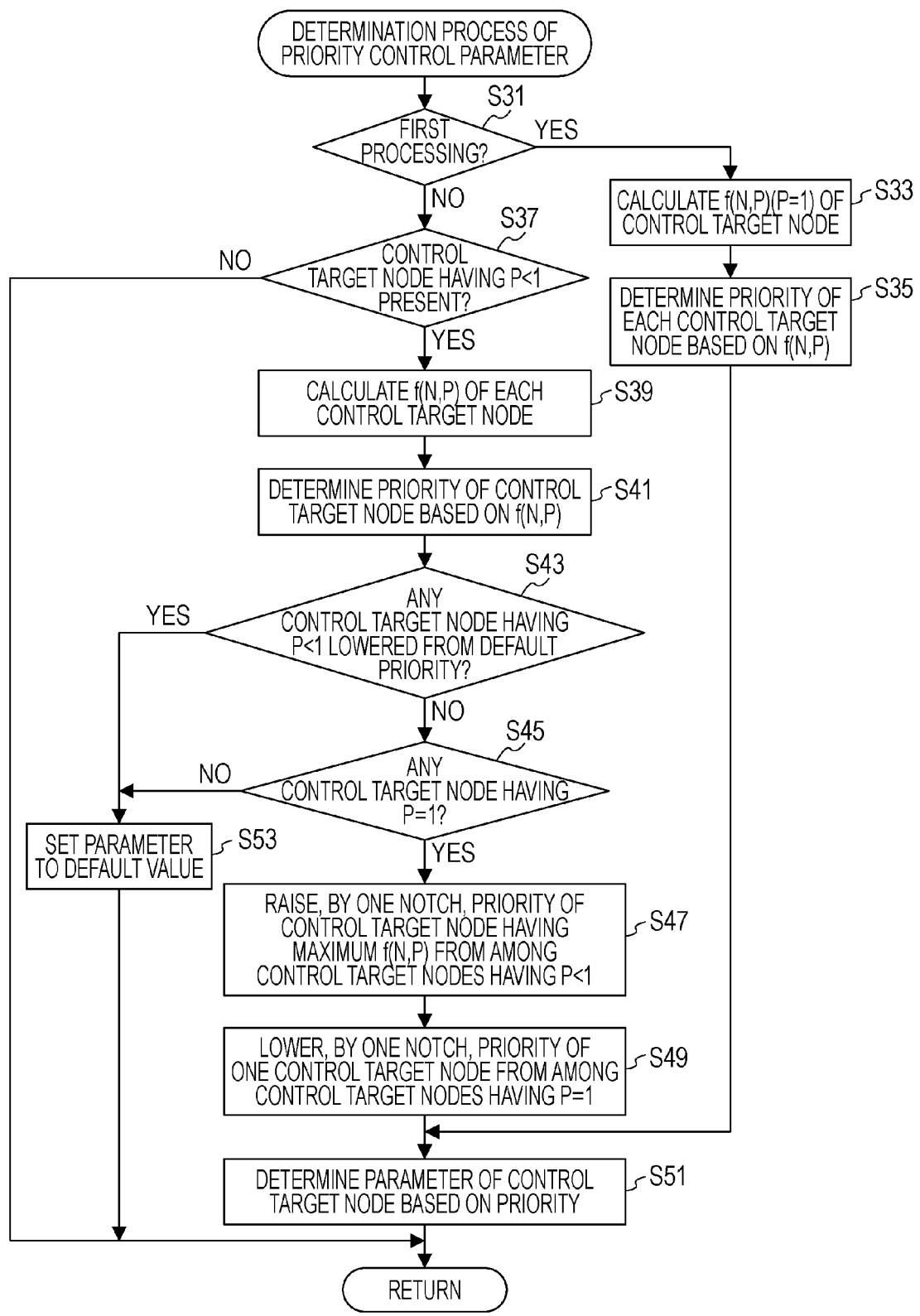
FIG. 10 illustrates a first example of a priority control parameter determination process.

A first example of the priority control parameter determination process is described below with reference to FIGS. 10-12. The parameter determiner 205 determines whether this process is the first processing or not (step S31). In accordance with the embodiment, the parameter determiner 205 determines default values of the priority and the parameter based on the assumption that the input-output rate ratio is 1 at the initial state. An evaluation value f(N,P) of each control target node is calculated and then stored on the memory 204 (step S33). For example, f(N,P)=N/P now. N0/P0, N1/P1 and N2/P2 are respectively calculated for the nodes STA0($n$), STA1($n$), and STA2($n$). The parameter determiner 205 determines the priority of each control target node based on the calculated evaluation value f(N,P) and stores the priority on the memory 204 (step S35). The determination of priority follows the rule listed in a table of FIG. 11. More specifically, threshold values "a," "b," and "c" are predetermined. If the evaluation value f(N,P) is higher than the value a, a priority "1" is set. If the evaluation value f(N,P) is higher than the value b but equal to or lower than the value a, a priority of "2" is set. If the evaluation value f(N,P) is higher than the value c but equal to or lower than the value b, a priority of "3" is set. If the evaluation value f(N,P) is equal to or lower than the value c, a priority of "4" is set. Appropriate values are predetermined for the threshold values a-c.

Processing proceeds to step S51. The parameter determiner 205 determines the priority control parameter in response to the priority for each control target node, and stores the priority control parameter onto the memory 204 (step S51). Processing then returns.

In step S51, a mapping table mapping the priority to the priority control parameter set as illustrated in FIG. 12 is used. In accordance with the embodiment, the higher the priority, the lower the value of the priority becomes, and the higher the transmission opportunity becomes. Referring to FIG. 12, CW values include a maximum value and a minimum value. TXOP defines parameters respectively for IEEE802.11b (direct sequence spread spectrum (DSSS) and complementary code keying (CCK)), IEEE802.11a/g (orthogonal frequency division multiplexing (ODFM)), and other method. The relationships P≦Q≦R≦S and T≦U≦V≦W hold. As for CW, the higher the priority, the lower the value of the priority becomes. Packet transmission starts earlier, and the transmission opportunity becomes higher. The same is true of AIFS. More specifically, the higher the priority, the lower the value of the priority becomes. Packet transmission starts earlier, and the transmission opportunity becomes higher. On the other hand, as for TXOP, the higher the priority, the higher the value of the priority becomes. A duration throughout which the packet transmission is performed in an exclusive fashion is prolonged, and the transmission opportunity becomes higher. Here, aCWmin and aCWmax are predetermined values.

Returning to FIG. 10, if the process is not first processing, the parameter determiner 205 determines whether a control target node having P<1 is present (step S37). If it is determined that a control target node having P<1 is not present, it is not necessary to modify the priority control parameter and processing returns. The priority control parameter stored on the memory 204 is simply transmitted. If it is determined that a control target node having P<1 is present, the evaluation value f(N,P) of each control target node is calculated, and stored on the memory 204 (step S39). The calculation method in step S39 remains unchanged from the calculation method in step S33, but the value of P is different. The calculation result in step S39 is thus different from the calculation result in step S33.

The parameter determiner 205 determines the priority of each control target node in response to the evaluation value f(N,P) of the control target node and stores the priority on the memory 204 (step S41). The determination method of the priority remains unchanged from the determination method in step S35, but the priority assigned may be different.

The parameter determiner 205 determines whether any of control target nodes having P<1 has been lowered from a default priority (step S43). A default value of priority determined in step S35 is stored on the memory 204 and the parameter determiner 205 compares the current priority with the default priority. A drop taking place in the priority regardless of a current congestion means that there is a control target node having a higher priority. Step S43 is performed to determine whether such a condition is satisfied. If such a condition is satisfied, the parameter determiner 205 sets as a current parameter value the default value of the priority control parameter identified through steps S33 and S35 with P=1 (step S53). Processing thus returns.

If the condition is not satisfied in step S43, the parameter determiner 205 determines whether any control target node having P=1 is present (step S45). This determination is performed to determine whether any control target node permitting priority adjustment to be performed thereon is present, or to determine whether all the control target nodes have P<1. If there is no control target node having P=1, processing proceeds to step S53.

If there is a control target node having P=1, the parameter determiner 205 raises the priority of a control target node having a maximum evaluation value f(N,P) by one notch from among the control target nodes having P<1 (lowers the value of priority by one), and then stores the resulting priority on the memory 204 (step S47). The parameter determiner 205 further lowers by one notch the priority of one node (pseudo-randomly selected) from among the nodes having P=1 (raises the value of priority by one), and stores the resulting priority on the memory 204 (step S49). If the selected control target node has been raised in priority from a priority of P=1, a priority of P=1 is set. Processing proceeds to step S51. The parameter determiner 205 determines the priority control parameter from the priority thus adjusted. Processing thus returns.

By repeating the above-described process, a priority control parameter in an equilibrium state is determined on the basis of the number of hierarchically lower nodes in order to prevent congestion. If a congestion takes place, the priority is adjusted in response to a traffic state of the control target node (i.e., contention node) on the basis of the equilibrium state in order to clear congestion. If the process of FIG. 10 is repeated, the priority is adjusted in a stepwise fashion.

The above-described condition P=1 is deemed to be a state in which P=1 is established. More specifically, the condition P=1 is not limited to P=1 and if P falls within a predetermined range with respect to 1, that P is deemed to be P=1. The same is true of a second priority control parameter determination process to be discussed below.

The second priority control parameter determination process is described with reference to FIGS. 13 and 14. The parameter determiner 205 determines whether the process is first processing (step S61). In accordance with the embodiment, the parameter determiner 205 determines default values of the priority and the parameter based on the assumption that the input-output rate ratio is 1 at the initial state. An evaluation value f(N,P) of each control target node is calculated and then stored on the memory 204 (step S63). For example, f(N,P)=N/P now holds as in the first priority control parameter determination process. The parameter determiner 205 determines the priority of each control target node based on the calculated evaluation value f(N,P) and stores the priority on the memory 204 (step S65). The determination of priority follows the rule listed in a table of FIG. 11 in the same manner as described with reference to the first priority control parameter determination process. The priority value of each control target node determined in step S65 is stored on the memory 204 (step S67).

The parameter determiner 205 determines the priority control parameter in response to the priority for each control target node (step S69). In step S69, a mapping table mapping the priority to the priority control parameter set as illustrated in FIG. 14 is used. The concept of the priority control parameters listed in FIG. 14 is identical to the concept of the mapping table of FIG. 12. Specifically, the higher the priority, the lower the value of the priority becomes, and the higher the transmission opportunity becomes. More specifically, if the priority rises, the value of CW falls, the value of the AIFS falls, and the value of TXOP rises. The values of the priority control parameters for each control target node are stored on the memory 204 as default values (step S71). Processing then returns.

Figure 13:
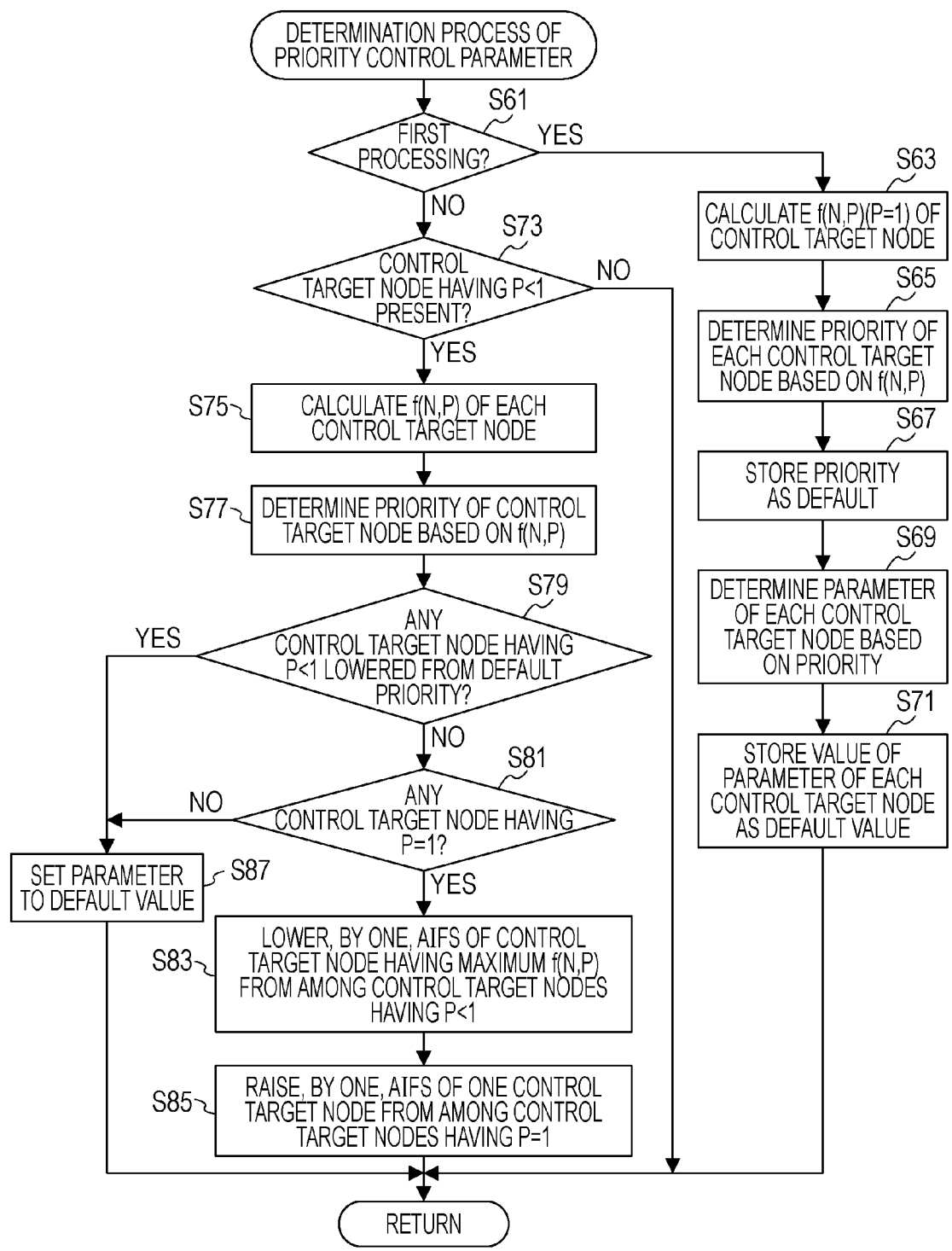
FIG. 13 illustrates a second example of the priority control parameter determination process.

Returning to step S61 in FIG. 13, if the process is not first processing, the parameter determiner 205 determines whether a control target node having P<1 is present (step S73). If it is determined that a control target node having P<1 is not present, it is not necessary to modify the priority control parameter and processing returns. The priority control parameter stored on the memory 204 is simply transmitted. If it is determined that a control target node having P<1 is present, the evaluation value f(N,P) of each control target node is calculated, and stored on the memory 204 (step S75). The calculation method in step S75 remains unchanged from the calculation method in step S63, but the value of P is different. The calculation result in step S75 is thus different from the calculation result in step S63.

The parameter determiner 205 determines the priority of each control target node in response to the evaluation value f(N,P) of the control target node and stores the priority on the memory 204 (step S77). The determination method of the priority remains unchanged from the determination method in step S65, but the priority assigned may be different.

The parameter determiner 205 determines whether any of control target nodes having P<1 has been lowered from a default priority (step S79). A default value of priority stored on the memory 204 in step S67 is compared with the priority calculated in step S77. A drop taking place in the priority regardless of a current congestion means that there is a control target node having a higher priority. Step S79 is performed to determine whether such a condition is satisfied. If such a condition is satisfied, the parameter determiner 205 sets as a current parameter value the default value of the priority control parameter identified in step S71 (step S87). Processing thus returns.

If the condition is not satisfied in step S79, the parameter determiner 205 determines whether any control target node having P=1 is present (step S81). This determination is performed to determine whether any control target node permitting priority adjustment to be performed thereon is present, or to determine whether all the control target nodes have P<1. If there is no control target node having P=1, processing proceeds to step S87.

If there is a control target node having P=1, the parameter determiner 205 lowers the value of AIFS of a control target node having a maximum evaluation value f(N,P) by 1 from among the control target nodes having P<1, and then stores the resulting AIFS value on the memory 204 (step S83). The value of AIFS only is adjusted here, but a different parameter may be adjusted instead or a plurality of parameters may be adjusted. Steps of adjustment are not limited to "1." In the adjustment of TXOP, a value thereof is increased.

The parameter determiner 205 further raises the value of AIFS of one node (pseudo-randomly selected) from among the nodes having P=1 by 1, and stores the resulting AIFS value on the memory 204 (step S85). The value of AIFS only is adjusted here, but a different parameter may be adjusted instead or a plurality of parameters may be adjusted as described with reference to step S83. Steps of adjustment are not limited to "1." If the selected control target node has been lowered in AIFS value from an AIFS value at P=1, the AIFS value at P=1 is set. Processing thus returns.

By repeating the above-described process, a priority control parameter in an equilibrium state is determined on the basis of the number of hierarchically lower nodes in order to prevent congestion. If a congestion takes place, the priority control parameter is adjusted in response to a traffic state of the control target node (i.e., contention node) on the basis of the equilibrium state in order to clear congestion. If the process of FIG. 13 is repeated, the priority control parameter is adjusted in a stepwise fashion.

In the above discussion, the priority control parameter is determined on the side of the controlling node (i.e., relay node). Alternatively, the priority may be determined on the side of the controlling node, the controlling node may notify the control target node of the priority, and the control target node may determine and set the priority control parameter from the priority.

Figure 15:
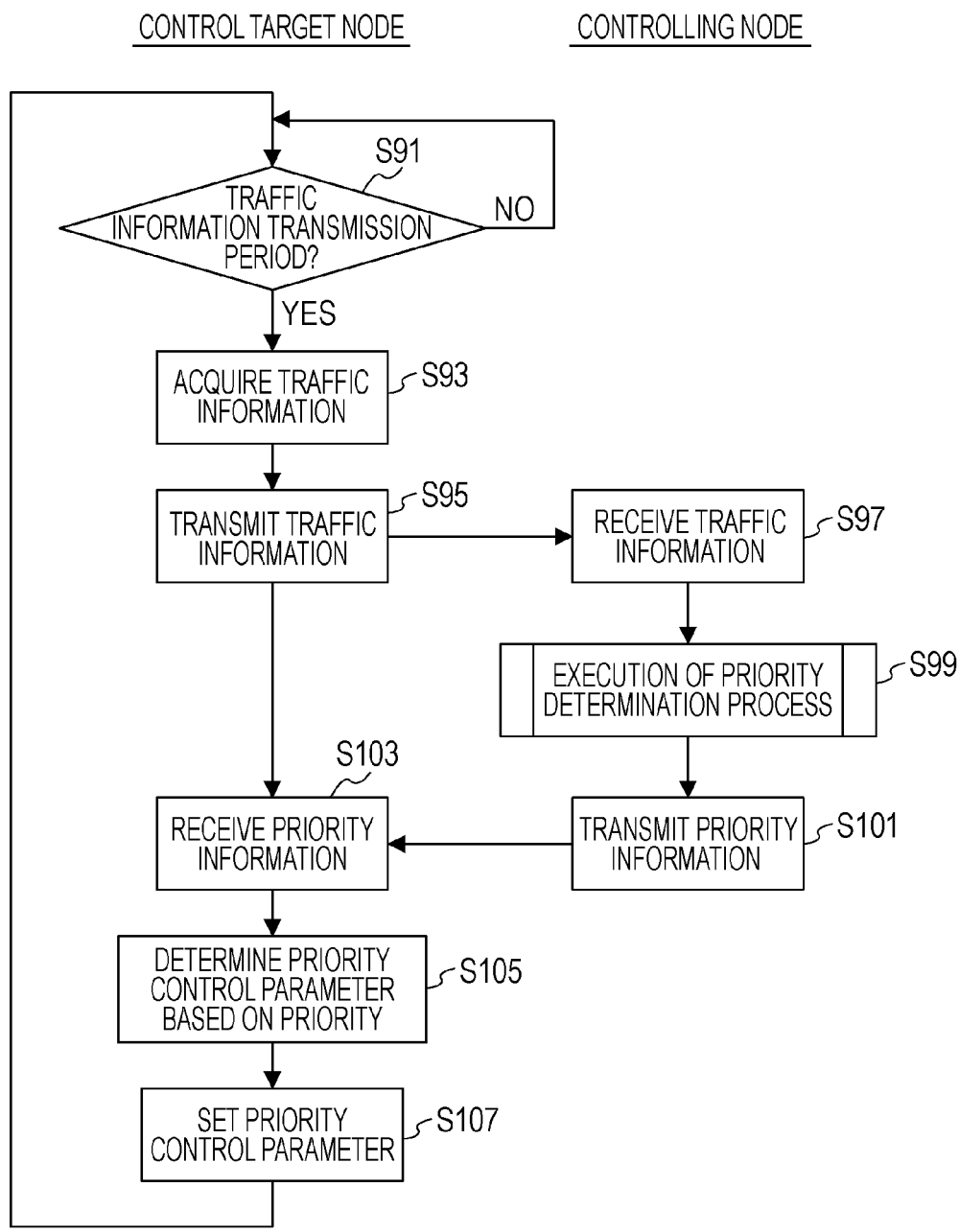
FIG. 15 is a flowchart of a second main process.

A process illustrated in FIG. 15 may be performed. The priority controller 105 of the control target node determines whether the traffic information agrees with a predetermined traffic information transmission period (step S91). For example, a timer may be arranged to measure the traffic information transmission period. If the traffic information fails to agree with the predetermined traffic information transmission period, the priority controller 105 waits on standby until the traffic information shifts to the predetermined traffic information period. If the traffic information agrees with the predetermined traffic information period, the priority controller 105 issues an instruction to the traffic monitoring unit 103. In response to the instruction from the priority controller 105, the traffic monitoring unit 103 reads the traffic information, i.e., the number of hierarchically lower nodes, the input rate R(n−1), and the output rate R(n) (step S93), and outputs the read information to the priority controller 105. The priority controller 105 outputs the traffic information received from the traffic monitoring unit 103 to the frame generator 108 to cause the frame generator 108 to generate the frame data containing the traffic information. The priority controller 105 causes the transmitter 106 to transmit to the controlling node a packet containing the traffic information based on the frame data (step S95). The transmission operation is controlled by the access controller 104.

The control target node calculates an input-output rate ratio P=R(n)/R(n−1), and transmits the input-output rate ratio and the number of hierarchically lower nodes. Another target control node also performs the same process.

The receiver 201 of the controlling node receives a packet containing the traffic information from the control target node (step S97), and outputs the packet to the frame analyzer 202. The frame analyzer 202 recognizes the packet containing the traffic information and outputs the packet to the parameter determiner 205. Upon receiving the traffic information, the parameter determiner 205 stores the traffic information onto the memory 204. The parameter determiner 205 performs a priority control parameter determination process (step S99). The priority control parameter determination process is different from the priority control parameter determination process illustrated in FIG. 10 in that step S51 is excluded and that the default priority is set in step S53.

If the priority control parameter for each control target node is determined in the priority control parameter determination process, the parameter determiner 205 instructs the frame generator 208 to generate the frame data containing the priority control parameter determined for each control target node, and causes the transmitter 206 to transmit to each control target node the packet containing the priority control parameter (step S101).

Upon receiving the packet containing the priority control parameter from the controlling node (step S103), the receiver 101 outputs the packet to the frame analyzer 102. Recognizing the packet containing the priority, the frame analyzer 102 outputs the data of the priority to the priority controller 105. The priority controller 105 determines the priority control parameter (step S105) by reading the priority control parameter set responsive to the received priority from the mapping table (such as the one illustrated in FIG. 12) pre-stored on the memory 109 and mapping the priority to the priority control parameter set. The priority controller 105 then sets the received priority control parameter on the access controller 104 (step S107). The access controller 104 stores the priority control parameter on the memory 109. The access controller 104 controls the packet transmission of the transmitter 106 in accordance with the set priority control parameter. Processing returns to step S91.

The same advantage is provided if the controlling node notifies the control target node of the priority.

In the above discussion, the controlling node and the control target node are arranged in separate units for simplicity of explanation. Each node of the wireless adhoc network, other than the root node and each terminal node of the tree structure, can serve as both a control target node and a controlling node. The wireless adhoc network can be modified as necessary. Even the root node and the terminal node of the tree structure can become a relay node. The function of the controlling node and the function of the control target node are thus typically integrated in practical installations.

Figure 16:
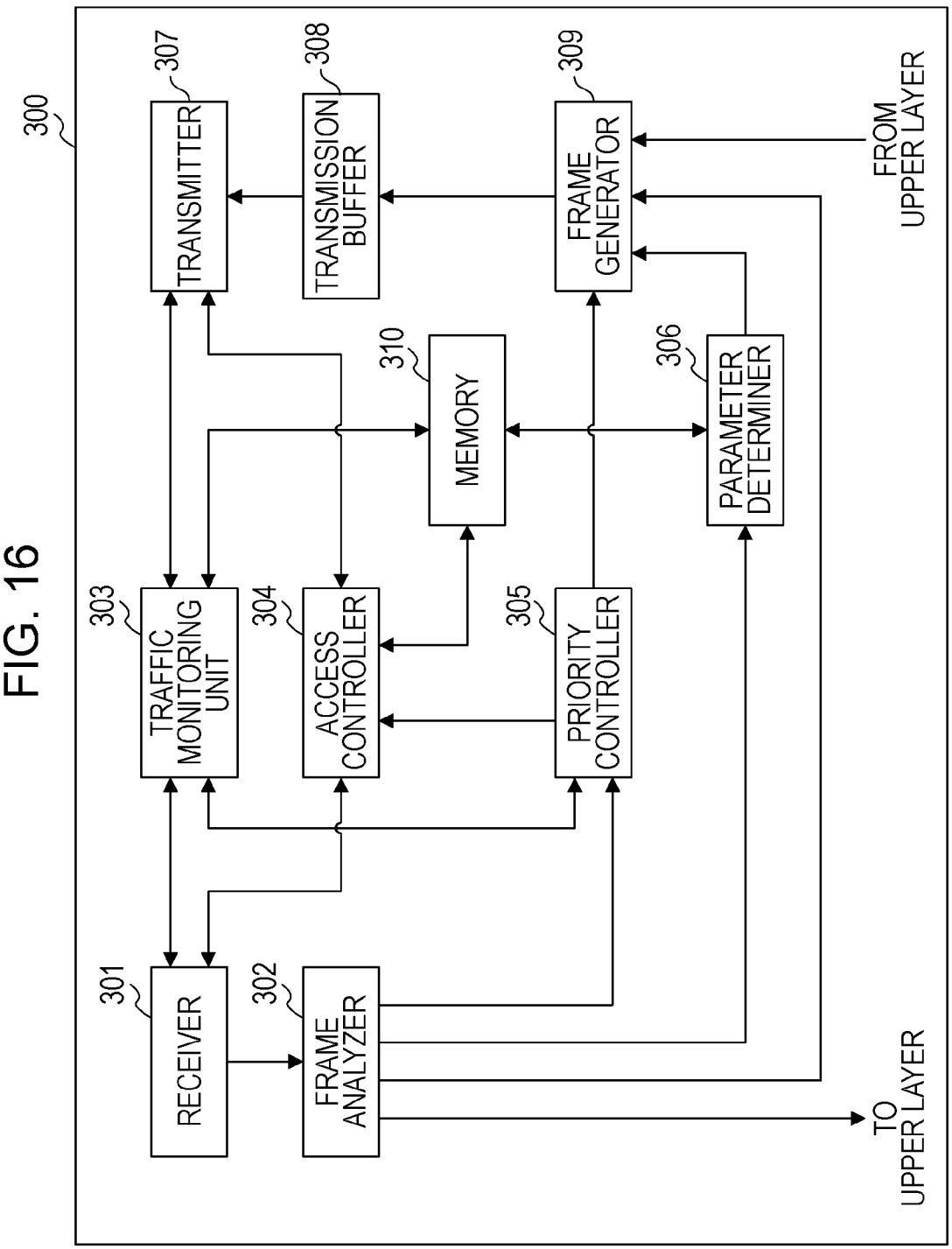
FIG. 16 is a functional block diagram of a radio communication apparatus having the function of a controlling node and a control target node.

In such a case, a radio communication apparatus 300 illustrated in FIG. 16 is implemented. The radio communication apparatus 300 illustrated in FIG. 16 includes receiver 301, frame analyzer 302, traffic monitoring unit 303, access controller 304, priority controller 305, parameter determiner 306, transmitter 307, transmission buffer 308, frame generator 309, and memory 310. The receiver 301, the frame analyzer 302, the access controller 304, the transmitter 307, the transmission buffer 308, and the frame generator 309 are identical to those illustrated in FIGS. 5 and 7. The traffic monitoring unit 303 has the same function as the function of the traffic monitoring unit 103. The priority controller 305 has the same function as the function of the priority controller 105. The memory 310 stores the same data as the data stored on each of the memory 109 and the memory 204. And the parameter determiner 306 has the same function as the function of the parameter determiner 205. The functions cooperate with each other in the same manner as illustrated in FIGS. 5-7.

The embodiments of the technique have been described. The technique is not limited to the above-described embodiments. For example, the configuration of the functional blocks has been illustrated for exemplary purposes only, and do not necessarily accurately agree with actual block arrangements. The process flow discussed above may be modified as long as the process results remain unchanged.

Numerical values in tables illustrated in FIGS. 11 and 12 are listed for exemplary purposes only. Appropriate values may be further defined in accordance with specific network parameters. The numerical values may vary depending on application environments. A plurality of patterns of numerical values may be prepared and a particular pattern may be used in response to any factor of the application environment.

The above-described standards have been discussed for exemplary purposes only, and another standard compatible with a major portion of the embodiment may be used.

A program for causing hardware to perform the above-described process may be produced. The program may be stored on one of computer readable storage media or storage devices including a flexible disk, a CD-ROM, a magneto-optical disk, a semiconductor memory, and a hard disk. Data in the middle of the process may be temporarily stored on a memory or the like of a computer.

The embodiment described above is a preferred embodiment. The present invention is not limited to this but various modifications can be made without departing from the spirit of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A radio communication apparatus, comprising:
a receiver configured to receive a traffic evaluation index value of a contention node as a connection node one layer below the radio communication apparatus, with a root node of a radio network set as a top layer;

a processor configured to determine a parameter related to priority control of the contention node, or a priority for determining the parameter, based on the traffic evaluation index value of the contention node so that a traffic congestion is prevented and cleared; and a transmitter configured to transmit the parameter related to the priority control of the contention node, or the priority, to the contention node, wherein the processor determines the parameter related to the priority control so that one of a plurality of contention nodes having a relatively higher probability of traffic increase with respect to others of the plurality of contention nodes enjoys a higher transmission opportunity.

2. The radio communication apparatus according to claim 1, wherein the processor determines the parameter related to the priority control so that one of the plurality of contention nodes providing a reception data index value indicative of an amount of reception data, or a reception data rate, from the one of the plurality of contention nodes below the radio communication apparatus by one layer that is higher than a transmission data index value indicative of an amount of transmission data, or a transmission data rate, from the radio communication apparatus enjoys the higher transmission opportunity.

3. The radio communication apparatus according to claim 2, wherein the traffic evaluation index value comprises a number of nodes under the contention node, the reception data index value, and the transmission data index value, and wherein the processor calculates a parameter determining index value based on the number of nodes, and an output-input ratio of the transmission data index value to the reception data index value, and determines the parameter related to the priority control of the contention node based on the parameter determining index value of the contention node.

4. The radio communication apparatus according to claim 3, wherein the processor determines the priority based on the parameter determining index value and identifies a parameter set predetermined for the priority.

5. The radio communication apparatus according to claim 4, wherein when contention nodes having an output-input ratio less than 1 appear, the processor selects a contention node having a priority that is to be raised based on the parameter determining index value from among the contention nodes, and selects a contention node having a priority that is to be lowered from among contention nodes having an output-input ratio of 1.

6. The radio communication apparatus according to claim 5, wherein the processor defaults the priority to an initial value when the output-input ratio returns to 1 after becoming less than 1 or when the output-input ratios of all the nodes become less than 1.

7. The radio communication apparatus according to claim 3, wherein the processor determines the priority based on the parameter determining index value.

8. The radio communication apparatus according to claim 7, wherein when contention nodes having an output-input ratio less than 1 appear, the processor selects a contention node having a priority that is to be raised based on the parameter determining index value from among the contention nodes, and selects a contention node having a priority that is to be lowered from among contention nodes having an output-input ratio of 1.

9. The radio communication apparatus according to claim 3, wherein when contention nodes having an output-input ratio less than 1 appear, the processor selects at least one contention node based on the parameter determining index value from among the contention nodes, and modifies the value of at least one parameter of the parameters of the selected contention node in a manner such that the transmission opportunity is increased, and selects at least one contention node of the contention nodes having an output-input ratio of 1, and modifies the value of at least one parameter of the parameters of the selected contention node in a manner such that the transmission opportunity is decreased.

10. The radio communication apparatus according to claim 9, wherein the parameter determining unit modifies the value of the parameter in a stepwise fashion.

11. The radio communication apparatus according to claim 9, wherein the processor defaults the parameter of the contention node to an initial value when the output-input ratio returns to 1 after becoming less than 1 or when the output-input ratios of all the nodes become less than 1.

12. The radio communication apparatus according to claim 2, wherein the traffic evaluation index value comprises a number of nodes under the contention node, and an output-input ratio of the transmission data index value to the reception data index value, and wherein the processor calculates a parameter determining index value based on the number of nodes, and the output-input ratio of the transmission data index value to the reception data index value, and determines the parameter related to the priority control of the contention node based on the parameter determining index value of the contention node.

13. A radio communication apparatus, comprising:

a receiver configured to receive a traffic evaluation index value of a contention node as a connection node one layer below the radio communication apparatus, with a root node of a radio network set as a top layer;

a processor configured to determine a parameter related to priority control of the contention node, or a priority for determining the parameter, based on the traffic evaluation index value of the contention node so that a traffic congestion is prevented and cleared; and a transmitter configured to transmit the parameter related to the priority control of the contention node, or the priority, to the contention node; wherein the processor collects the traffic evaluation index value of the radio communication apparatus, the transmitter transmits to a node above the radio communication apparatus by one layer the collected traffic evaluation index value, and the receiver receives the parameter related to the priority control of the radio communication apparatus from the node above the radio communication apparatus by one layer and setting the parameter.

14. The radio communication apparatus according to claim 13, wherein the processor counts a number of nodes under the contention node by monitoring a transmission source address of a reception packet in order to collect the traffic evaluation index value.

15. A radio communication apparatus, comprising:

a receiver configured to receive a traffic evaluation index value of a contention node as a connection node one layer below the radio communication apparatus, with a root node of a radio network set as a top layer;

a processor configured to determine a parameter related to priority control of the contention node, or a priority for determining the parameter, based on the traffic evaluation index value of the contention node so that a traffic congestion is prevented and cleared; and a transmitter configured to transmit the parameter related to the priority control of the contention node, or the priority, to the contention node, wherein the processor collets the traffic evaluation index value of the radio communication apparatus, the transmitter transmits to a node above the radio communication apparatus by one layer the collected traffic evaluation index value, the receiver receives a priority determining the parameter related to the priority control of the radio communication apparatus from the node above the radio communication apparatus by one layer, and the processor identifies the parameter related to the priority control responsive to the priority and sets the parameter.

16. The radio communication apparatus according to claim 15, wherein the processor counts a number of nodes under the contention node by monitoring a transmission source address of a reception packet in order to collect the traffic evaluation index value.

17. A radio communication apparatus, comprising:

a processor configured to collect a total number of nodes below the radio communication apparatus with a root node of a radio network working as a hierarchically top layer, and a traffic evaluation index value containing a reception data index value indicative of an amount of reception data, or a reception data rate, from a node below the radio communication apparatus by one layer, and a transmission data index value indicative of an amount of transmission data, or a transmission data rate, of an upward transmission from the radio communication apparatus;

a transmitter configured to transmit to a node above the radio communication apparatus by one layer a combination of an output-input ratio of the transmission data index value to the reception data index value and one of the traffic evaluation index value and the total number of nodes; and a receiver configured to receive from the node above the radio communication apparatus by one layer a parameter related to priority control and setting the parameter, wherein the processor performs the priority control in accordance with the parameter related to the priority control.

18. A radio communication apparatus comprising:

a processor configured to collect a total number of nodes below the radio communication apparatus with a root node of a radio network working as a hierarchically top layer, and a traffic evaluation index value containing a reception data index value indicative of an amount of reception data, or a reception data rate, from a node below the radio communication apparatus by one layer, and a transmission data index value indicative of an amount of transmission data, or a transmission data rate, of an upward transmission from the radio communication apparatus;

a transmitter configured to transmit to a node above the radio communication apparatus by one layer a combination of an output-input ratio of the transmission data index value to the reception data index value and one of the traffic evaluation index value and the total number of nodes; and a receiver configured to receive from the node above the radio communication apparatus by one layer a priority determining a parameter related to priority control, wherein the processor identifies the parameter related to the priority control responsive to the priority, and setting the parameter, and performs the priority control in accordance with the parameter related to the priority control.

* * * * *